United States Patent [19]
Green, III et al.

[11] Patent Number: 6,047,336
[45] Date of Patent: Apr. 4, 2000

[54] SPECULATIVE DIRECT MEMORY ACCESS TRANSFER BETWEEN SLAVE DEVICES AND MEMORY

[75] Inventors: Edward Hammond Green, III; Richard Gerard Hofmann; Mark Michael Schaffer, all of Cary; Dennis Charles Wilkerson, Durham, all of N.C.

[73] Assignee: International Business Machines Corporation, Armonk, N.Y.

[21] Appl. No.: 09/039,645

[22] Filed: Mar. 16, 1998

[51] Int. Cl.[7] .................................................. G06F 13/28
[52] U.S. Cl. .............................. 710/22; 710/25; 711/118; 711/167
[58] Field of Search .................................... 710/22, 23, 25, 710/26, 27, 28, 113, 119; 711/118, 167; 395/725

[56] References Cited

U.S. PATENT DOCUMENTS

| | | | |
|---|---|---|---|
| 4,530,053 | 7/1985 | Kriz et al. ................................. | 364/200 |
| 5,018,098 | 5/1991 | Taniai et al. ............................. | 364/900 |
| 5,179,709 | 1/1993 | Bailey et al. ............................ | 395/725 |
| 5,195,185 | 3/1993 | Marenin ................................... | 395/325 |
| 5,218,702 | 6/1993 | Kirtland .................................. | 395/725 |
| 5,408,615 | 4/1995 | Ishikawa ................................. | 395/275 |
| 5,548,786 | 8/1996 | Amini et al. ............................. | 710/22 |
| 5,561,819 | 10/1996 | Gephardt et al. ........................ | 710/27 |
| 5,761,532 | 6/1998 | Yarch et al. ............................. | 710/22 |
| 5,761,708 | 6/1998 | Cherabuddi et al. .................... | 711/118 |
| 5,822,616 | 10/1998 | Hirooka .................................. | 710/22 |

OTHER PUBLICATIONS

IBM Technical Disclosure Bulletin, V27, #5, Oct. 1994 "Interfacing of Slow Direct Memory Access and Peripheral Devices to a High Speed Bus".

Primary Examiner—Thomas C. Lee
Assistant Examiner—Harold Kim
Attorney, Agent, or Firm—John B. Frisone

[57] ABSTRACT

A DMA Controller, in response to a data transfer request from a slave device, initiates a memory transfer cycle and informs the slave device when the data transfer has completed. In order to avoid dead clock cycles on internal bus(es), the DMA Controller initiates a speculative data transfer cycle after the notification. The DMA Controller aborts the speculative data transfer cycle if the slave device does not request another data transfer within a predetermined time.

9 Claims, 4 Drawing Sheets

SPECULATIVE DIRECT MEMORY ACCESS TRANSFER BETWEEN SLAVE DEVICES AND MEMORY

BACKGROUND OF THE INVENTION

This invention relates to direct memory access (DMA) transfers between peripheral devices and a memory via a DMA controller acting as a bus master located on a processor local bus (PLB).

In the recent past, significant advances in silicon densities have permitted the integration of many functions onto a single silicon chip which includes the processor. The increase in density has allowed the integration of some peripheral functions which were formerly implemented at the card level over a system level bus. Some of the functions being integrated on the chip include audio, video and graphics. These functions have increased bandwidth requirements and require efficient utilization of the on-chip bus used to transfer data between a memory and the peripherals.

In most applications several bus masters, such as DMA controllers, share an on-chip processor local bus (PLB) under control of a bus arbiter. It is essential that the bus masters relinquish the bus as soon as they no longer require it in order to improve bandwidth utilization. However, it is also more efficient to retain control of the bus when a peripheral requires back-to-back data transfers. The two requirements present a conflict.

Once a DMA Acknowledge (DMAA) signal is asserted by the DMA controller to signal a data transfer, the peripheral will use the DMA Acknowledge (DMAA) to de-assert its request if it requires no more transfers. Due to delays, this event takes place very late in the clock cycle. Therefore, the de-assertion of a request must be single latched by the DMA before it can be sampled. PLB bus master requests must start at the beginning of a clock cycle (driven off the output of a latch). For a single clock cycle DMA Acknowledge, the earliest the DMA can sample the peripheral request is the clock after the DMAA. Unfortunately, the DMA cannot instantaneously turn its bus master request on based on the sampling of the peripheral request. Therefore, the DMA must wait for one clock and then assert its PLB bus master request if the peripheral has its request active for another transfer cycle. This results in a lost or "dead" clock cycle between back-to-back DMA peripheral transfers.

SUMMARY OF THE INVENTION

The invention contemplates a method and apparatus for providing back-to-back DMA transfers with no lost or dead clock cycles between the back-to-back transfers. This is accomplished by asserting a DMA PLB Bus Master Request following the ned of a peripheral transfer when the peripheral request is valid and continuing if the peripheral request remains valid. If the peripheral request is sampled de-asserted in the clock cycle following the de-assertion of DMAA, the DMA asserts a DMA PLB Abort signal which informs the bus arbiter and other devices connected to the PLB that the request should be ignored. The DMA PLB Abort signal is valid if it occurs by the mid point of the current request clock cycle, thus the abort becomes effective as soon as the sampled peripheral request is de-asserted. Since many transfers involve back-to-back transfers, this results in an improvement in the utilization of the bus bandwidth.

DETAILED DESCRIPTION OF THE INVENTION

Figure 1:
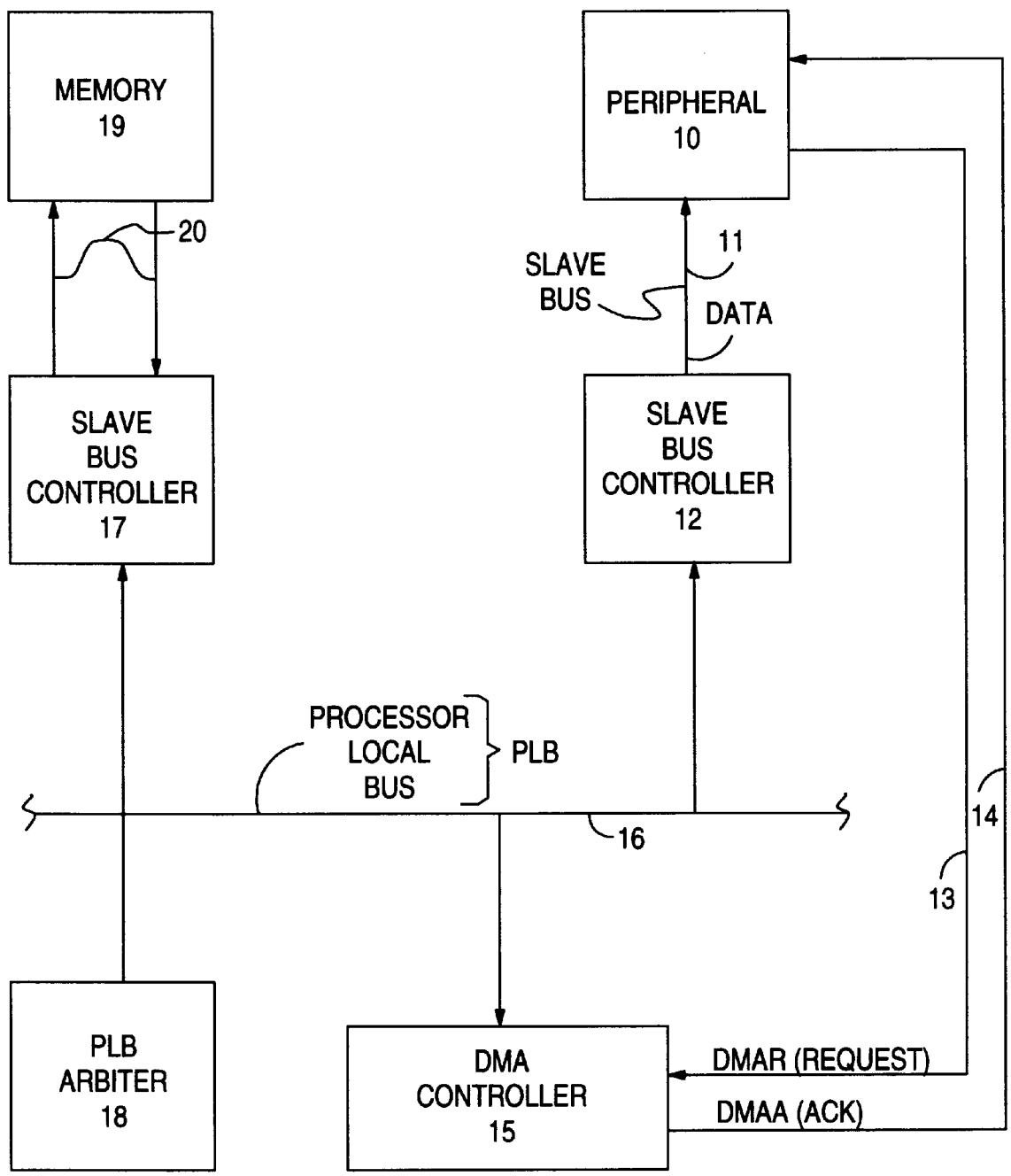
FIG. 1 is a block diagram of a DMA buffered memory to peripheral transfer configuration.

In FIG. 1, a Peripheral Device 10 is connected by a Slave Data Bus 11 to a Slave Bus Controller (SBC) 12 and by a DMA Request (DMAR) lines 13 and a DMA Acknowledge (DMAA) line 14 to a DMA Controller (DMAC) 15. A Processor Local Bus (PLB) 16 interconnects SBC 12, DMAC 15, a second Slave Bus Controller (SBC) 17 and a PLB Arbiter (PLBA) 18. SBC 17 is connected to a memory 19 by Slave Bus 20 which includes both data and address lines. The PLB serves other Bus Masters not shown. The PLBA 18, using conventional arbitration techniques, allows the bus masters to share the Bus 16. As stated before, the bus masters request must be asserted at the beginning of a clock cycle in order to meet the timing requirements of the PLB Arbiter.

In operation, the Peripheral 10 asserts a DMAR on line 13. In response to the request, the properly configured DMAC 15 initiates a memory read cycle on the PLB 16 at the address specified by the properly configured DMAC 15. SBC 17 acknowledges and initiates a read operation at the specified address and the data is provided over bus 20. The data read from Memory 19 is forwarded over the PLB 16 to the DMAC 15 where it is stored. The DMAC 15 then performs a write cycle directed over PLB 16 to the SBC 12. SBC 12 acknowledges and drives the data onto bus 11. The DMAC 15 then asserts the DMAA signal on line 14 and the Peripheral 10 copies the data on Bus 11.

If DMAR is still asserted during the last clock of DMAA, the DMAC 15 will assert a subsequent PLB DMA Request based on the speculation that the Peripheral 10 will require another transfer. If the Peripheral 10 de-asserted DMAR in the last clock cycle of DMAA, the DMAC 15 will assert a PLB Abort signal to terminate the current PLB request and make the PLB available via the PLB arbiter 18. This will occur in the same clock cycle that the DMAC 15 samples the de-asserted DMAR from Peripheral 10. The PLB Abort signal need not be asserted until the mid point of the clock cycle which occurs after the peripheral de-asserts the DMAR signal. The specific sequence of signals for this configuration (see FIG. 4) are illustrative and will be described in detail below.

Figure 2:
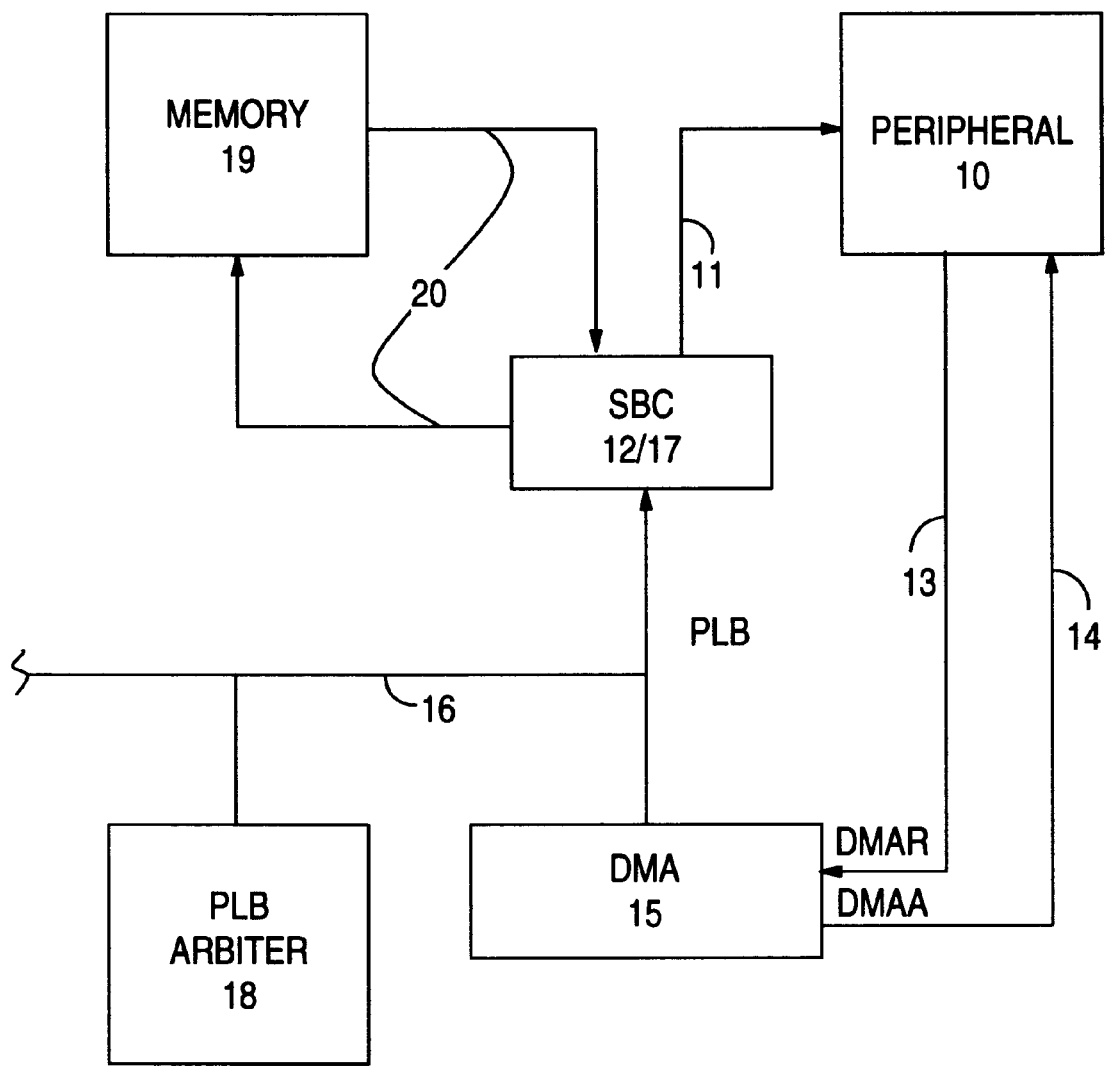
FIG. 2 is a block diagram of a slave buffered memory to peripheral transfer configuration.

In FIG. 2 (and FIG. 3), like elements have been provided with the same reference numerals. In this figure, a single Slave Bus Controller 12/17 is used and data read from Memory 19 is buffered in the SBC 12/17. As in FIG. 1, the Peripheral 10 asserts DMAR, the DMAC performs a PLB transfer cycle and the SBC 12/17 reads the data into its buffer. It then drives the data onto the Bus 11. The DMAC 15 asserts DMAA and the Peripheral 10 copies the data on Bus 11. Here also the DMAC 15 executes a speculative DMA PLB Request. If the Peripheral 10 deasserts the DMAR during the last clock of DMAA, the DMAC 15 asserts the DMA PLB Abort as described above.

Figure 3:
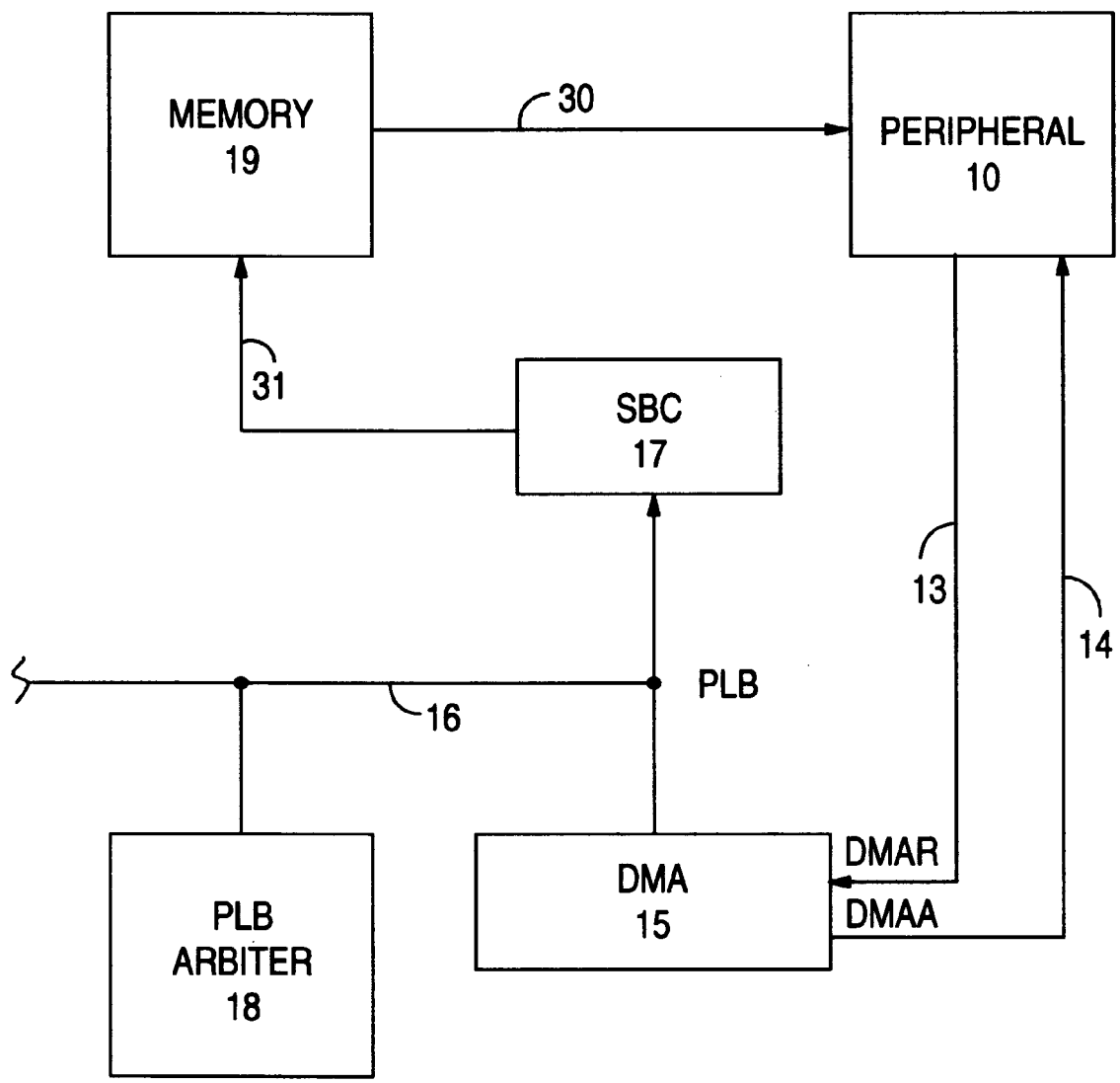
FIG. 3 a block diagram of a direct or "flyby" memory to peripheral transfer configuration.

In FIG. 3, the Peripheral 10 is directly connected to the Memory 19 by a Data Bus 30. The SBC 17 provides address and control information to Memory 19 by a Bus 31. The DMAR lines 13 and DMAA line 14 are connected to DMAC 15 and function as previously described. In operation, the Peripheral 10 generates a properly configured DMAR on lines 13. The DMAC 15 performs a transfer cycle directed to the SBC 17 via the PLB. The SBC 17 acknowledges and initiates a memory read operation via the bus 31.

Upon acknowledgement, the DMAC 15 asserts DMAA over line 14. The Peripheral 10, in response to the DMAA, copies the data on the Bus 30. At this point, the operation of the DMAC 15 and the Peripheral 10 are identical to that described above in connection with FIGS. 1 and 2.

The description thus far has been limited to memory to slave peripheral data transfer cycles. A peripheral slave to memory data transfer cycle is the reverse of the process described above. For example, in the direct transfer illustrated in FIG. 3, the Slave Peripheral 10 generates a request DMAR (indicating a write data transfer as opposed to read data transfer) on line 13. In response, the DMAC 15 initiates a write data transfer cycle directed to SBC 12/17 via the PLB Bus 16. The SBC 12/17 acknowledges the cycle via PLB 16 and in response, the DMAC 15 asserts DMAA via line 14. Upon receipt of the DMAA, the Slave Peripheral 10 drives the data onto the Bus 30 and the SBC 12/17 performs a memory write operation at the address specified by the DMAC 15. The DMAC 15, after deasserting the DMAA, initiates a speculative data transfer cycle and examines the line 13 for a subsequent DMAR. If a timely subsequent DMAR is not asserted, the DMAC 15 asserts a PLB Abort.

Figure 4:
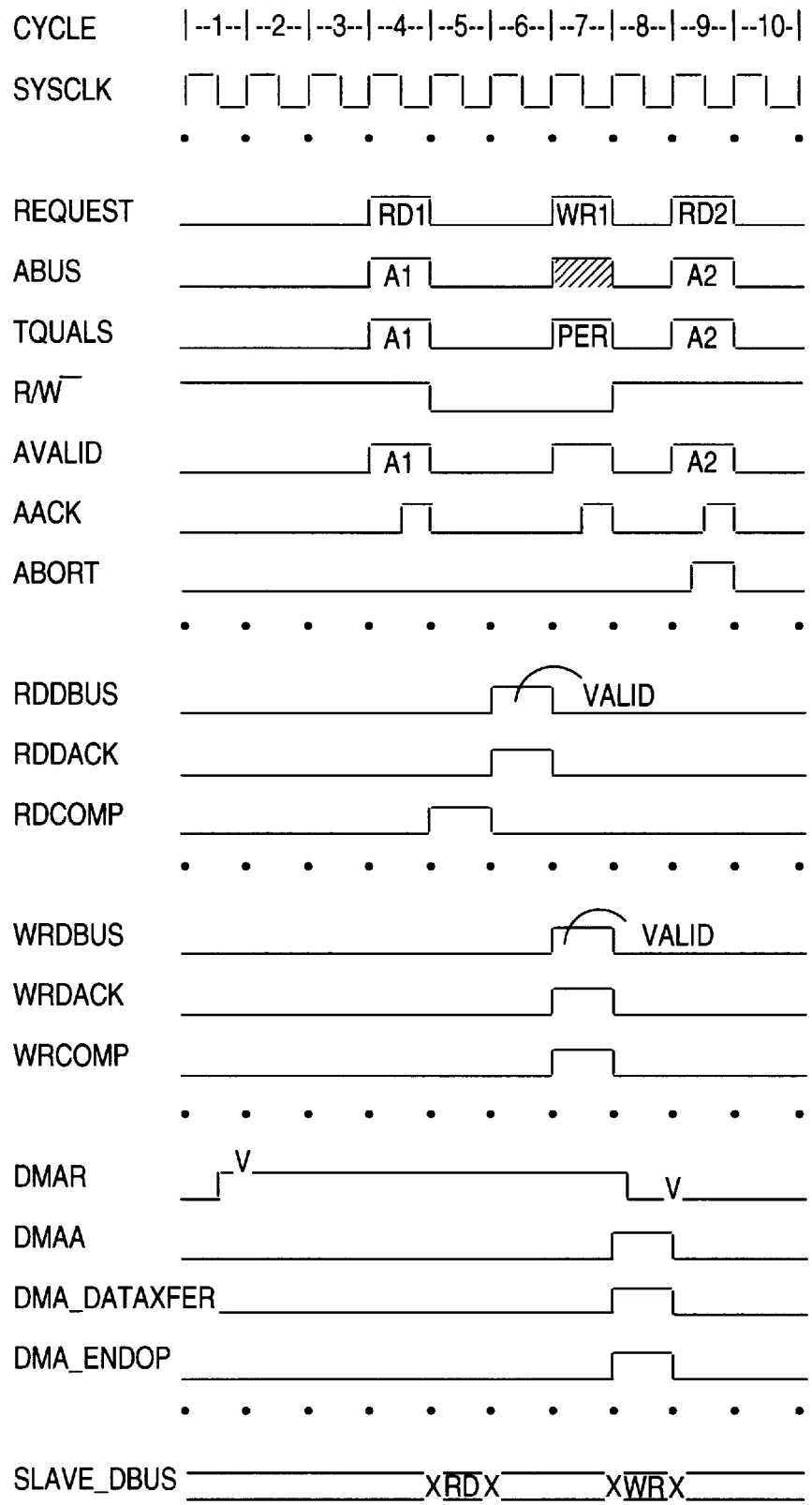
FIG. 4 is a timing diagram illustrating a sequence of signals generated in a DMA buffered memory to peripheral transfer.

FIG. 4 illustrates signals used in the DMA buffered memory to peripheral transfer (FIG. 1). They cover ten consecutive clock cycles and illustrate a DMAR by the Peripheral 10 followed by a data transfer, a subsequent de-assertion of the DMAR by the Peripheral 10 and a speculative request by the DMAC 15 followed by assertion of the PLB Abort signal. The signals are defined below.

Request (DMAC PLB Request): This signal is asserted by the DMAC to request a data transfer across the PLB bus.

ABus (Address Bus): The DMA memory address. The SBC 17 must latch the address at the end of the cycle in which it asserts an Address Acknowledge (AAck) signal.

TQuals (Transfer Qualifiers): These signals are driven by the DMAC and are valid any time that the Request signal is active. The signals define the size and type of the transfer.

R/W (Read/Write): Driven by the DMAC and valid any time the Request is active. Indicates to an SBC a read or a write transfer.

AValid (Address Valid): This signal is driven by the PLB Arbiter to indicate that a valid address and transfer qualifiers are on the PLB. All SBC's sample this signal and, if the address is within their address range and they are capable of performing the transfer, they respond by asserting their AAck signal.

Abort (transfer abort): This signal is driven by the DMAC and causes any SBC to discontinue any response to the signal and the arbiter to re-arbitrate.

RdDBus<0:n>(Read Data Bus): Is an n bit data bus used to transfer data during a read operation from an SBC to a Bus Master such as the DMAC.

RdDAck (Read Data Acknowledge): This signal is driven by the SBC's and indicates to a Bus Master that the data on the read data bus is valid and must be latched at the end of the current cycle.

RdComp (Data Read Complete): This signal is driven by the SBC's and is used to indicate to the Bus Arbiter that the read operation has completed.

WrDBus<0:n>(Write Data Bus): This is an n bit data bus which is used to transfer data during a write operation from the DMAC to an SBC.

WrDAck (Write Data Acknowledge): This signal is driven by a SBC and informs the DMAC that write data will be latched at the end of the current cycle.

WrComp (Data Write Complete): This signal is asserted by an SBC to notify the Bus Arbiter that a write transfer has been completed.

DMAR (DMA peripheral request): This signal is driven by a peripheral to request a read or write memory operation.

DMAA (peripheral acknowledge): This signal is driven by the DMAC to inform the peripheral that it can latch or drive data from or onto the slave bus.

DMA_dataXfer (DMA data transfer) not required for the waveform shown: This signal is driven by the DMAC to indicate to the SBC the last active clock of the DMAA signal. It is used for data latching during peripheral read operations.

DMA_endOP (DMA end of operations): This signal is driven by the DMAC to indicate to the SBC's the last active clock of a DMA transfer. It is used for data hold times during a DMA peripheral write operation.

While several embodiments of the invention have been described and illustrated in detail, it will be obvious to those skilled in this art that modifications and variations can be made without departing from the scope of the invention as set forth in the claims.

We claim:

1. A system for transferring data between a processor memory and a slave device comprising:

first control means connected to the memory and the slave device for operating the memory and transferring data between the memory and the slave device;

second control means connected to the first means and to the slave device;

means in the slave device for sending a request (DMAR) signal for a data transfer cycle to the second control means;

said second control means in response to the DMAR sending a request for a data transfer cycle to the first control means;

said first control means in response to the request from the second control means effecting the requested transfer between the memory and the slave device and acknowledging the same to the second means; and said second means in response to the acknowledgement from the first means sending an acknowledgement to the slave indicating completion of the data transfer cycle and speculatively requesting another data transfer cycle from the first means and following initiation of the speculative transfer cycle aborting the speculative transfer cycle if the slave device has not requested another data transfer cycle.

2. The system set forth in claim 1 in which the memory includes addressing means and data input/output means and said first means includes:

a controller;

a first bus for connecting the controller to the second means;

a second bus for connecting the controller to memory addressing means; and a third bus for connecting the input/output of the memory to the slave device.

3. The system set forth in claim 1 in which the memory includes addressing means and data input/output means and said first means includes:

a controller;

a first bus for connecting the controller to the second means;

a second bus for connecting the controller to the memory input/output and addressing means;

a third bus for connecting the controller to the slave device;

a buffer for temporarily storing data on the second bus during a data transfer cycle; and the controller generates and sends an acknowledge signal to the second means when transferred data resides in its buffer and makes the temporarily stored data available to the slave device via the third bus in response to said request (DMAR) signal from the first means via the first bus.

4. The system set forth in claim 1 in which the memory includes addressing means and data input/output means and said first means includes:

a first and a second controller;

a first bus for connecting the first and second controllers to the second means;

a second bus for connecting the first controller to the memory input/output and addressing means;

a third bus for connecting the second controller to the slave device;

the first controller places the transferred data on the first bus and sends an acknowledgement signal to the second means which stores the transferred data; and the second means places the stored transferred data on the first bus and requests the second controller to place the transfer data on the third bus and acknowledge when complete.

5. A system for transferring data between a processor memory and a slave device comprising:

a slave bus connected to said memory and said slave device;

a slave bus controller (SBC) for operating the memory and transferring data between the memory and the slave bus;

a processor local bus (PLB) connected to the slave controller;

a direct memory access controller (DMAC) connected to the PLB and to the slave device by control lines;

means in the slave device for sending a request (DMAR) for a data transfer cycle to the DMAC via the control lines;

first means in the DMAC for requesting the PLB and sending a request for a data transfer to the SBC;

means in the SBC for controlling the memory to effect the requested transfer between the memory and the slave bus and for acknowledging the same to the DMAC;

second means in the DMAC for sending an acknowledgement to the slave via the control lines and speculatively requesting the PLB and another data transfer cycle; and third means in the DMAC for examining the control lines following initiation of the speculative data transfer cycle to determine the transfer requirements of the slave device and aborting the speculative data transfer cycle if the slave device has not initiated another data transfer cycle.

6. A system for transferring data between a processor memory and a slave device comprising:

a first bus connected between the memory and the slave device;

a bus controller (SBC) for operating the memory and transferring data between the memory and the slave device;

a direct memory access controller (DMAC) connected to the slave device by control lines;

a second bus connected between the bus controller and the DMAC;

means in the slave device for sending a request (DMAR) for a data transfer cycle to the DMAC via the control lines;

first means in the DMAC for requesting the second bus and sending a request for a data transfer to the bus controller;

means in the bus controller for controlling the memory to place the requested data onto the first bus and for acknowledging the same to the DMAC;

second means in the DMAC for sending an acknowledgement to the slave via the control lines indicating the availability of the data on the first bus and for speculatively requesting the second bus and another data transfer cycle; and third means in the DMAC for examining the control lines following initiation of the speculative data transfer cycle to determine the transfer requirements of the slave device and aborting the speculative data transfer cycle if the slave device has not initiated another data transfer cycle.

7. A system for transferring data between a processor memory and a slave device comprising:

a direct memory access controller (DMAC) connected to the slave device by control lines;

a bus controller (SBC);

a first bus connected to said memory and said bus controller for transferring data between the memory and the bus controller via the first bus;

a second bus connected between the bus controller and the slave device for transferring data between the bus controller and the slave device;

a third bus interconnecting bus controller and the DMAC;

means in the slave device for sending a request (DMAR) for a data transfer cycle to the DMAC via the control lines;

first means in the DMAC for requesting the third bus and sending a request for a data transfer to the bus controller;

first means in the bus controller for controlling the memory to effect the requested transfer to the bus controller, for storing the transferred data and for acknowledging the transfer to the DMAC;

second means in the DMAC for sending an acknowledgement to the slave device via the control lines indicating the availability of the transferred data on the second bus, for requesting the bus controller to place the transferred data onto the second bus and for speculatively requesting the third bus and another data transfer cycle; and third means in the DMAC for examining the control lines following initiation of the speculative data transfer cycle to determine the transfer requirements of the slave device and for aborting the speculative data transfer cycle if the slave device has not initiated another data transfer cycle.

8. A system for transferring data between a processor memory and a slave device comprising:

a direct memory access controller (DMAC) connected to the slave device by control lines;

first and second bus controllers (BC1 and BC2);

a first bus connected to said memory and said first bus controller for transferring data between the memory and the first bus controller via the first bus;

a second bus connected between the second bus controller and the slave device for transferring data between the second bus controller and the slave device;

a third bus interconnecting the first and second bus controllers and the DMAC;

means in the slave device for sending a request (DMAR) for a data transfer cycle to the DMAC via the control lines;

first means in the DMAC for requesting the third bus and sending a request for a data transfer to the first bus controller;

means in the first bus controller for controlling the memory to effect the requested transfer to the first bus controller and for sending the transferred data to the DMAC;

second means in the DMAC for sending an acknowledgement to the slave device via the control lines the availability of the data on the second bus, for sending the transferred data to the second bus controller for placement on the second bus and for speculatively requesting the third bus and another data transfer cycle; and third means in the DMAC for examining the control lines following initiation of the speculative data transfer cycle to determine the transfer requirements of the slave device and aborting the speculative data transfer cycle if the slave device has not initiated another data transfer cycle.

9. In a data processing system including a data storage memory, a Direct Memory Access Controller (DMAC) for controlling read/write access to the memory and a slave device needing read/write access to the memory a method for transferring data between the memory and the slave device comprising the steps:

initiating a data transfer at the slave device by sending a request for a data transfer (DMAR) to the DMAC;

in response to the request the DMAC initiating a data transfer cycle to the slave device, informing the slave device of the transfer when completed, and initiating a subsequent speculative data transfer; and aborting the subsequent speculative data transfer if the slave device does not request another data transfer within a predetermined time period.

* * * * *